US009886775B2

(12) United States Patent
Cao et al.

(10) Patent No.: US 9,886,775 B2
(45) Date of Patent: Feb. 6, 2018

(54) METHOD FOR DETECTING HORIZONTAL AND GRAVITY DIRECTIONS OF AN IMAGE

(71) Applicant: Institute of Automation Chinese Academy of Sciences, Beijing (CN)

(72) Inventors: Zhiqiang Cao, Beijing (CN); Xilong Liu, Beijing (CN); Chao Zhou, Beijing (CN); Min Tan, Beijing (CN); Kun Ai, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/306,980

(22) PCT Filed: Apr. 28, 2014

(86) PCT No.: PCT/CN2014/076399
§ 371 (c)(1),
(2) Date: Oct. 26, 2016

(87) PCT Pub. No.: WO2015/165015
PCT Pub. Date: Nov. 5, 2015

(65) Prior Publication Data
US 2017/0046855 A1    Feb. 16, 2017

(51) Int. Cl.
*G06K 9/00*     (2006.01)
*G06T 7/60*     (2017.01)

(52) U.S. Cl.
CPC ...... *G06T 7/60* (2013.01); *G06T 2207/10004* (2013.01)

(58) Field of Classification Search
CPC ... G06T 7/60; G06T 7/70; G06T 2207/10004; G06T 2207/20021; G06T 2207/20084; G06T 2207/30244; G06T 2207/30252
(Continued)

(56) References Cited
U.S. PATENT DOCUMENTS 5,574,498 A * 11/1996 Sakamoto ............. G01S 3/7864
348/169
2010/0302410 A1* 12/2010 Naito ....................... G03B 5/00
348/231.99

(Continued)

*Primary Examiner* — Mekonen Bekele
(74) *Attorney, Agent, or Firm* — Muncy, Geissler, Olds & Lowe, P.C.

(57) ABSTRACT

The disclosure relates to a method for detection of the horizontal and gravity directions of an image, the method comprising: selecting equidistant sampling points in an image at an interval of the radius of the sampling circle of an attention focus detector; placing the center of the sampling circle of the attention focus detector on each of the sampling points, and using the attention focus detector to acquire attention focus coordinates and the corresponding significant orientation angle, and all the attention focus coordinates and the corresponding significant orientation angles constitute a set $\Omega_p$; using an orientation perceptron to determine a local orientation angle and a weight at the attention focus according to the gray image information, and generating a local orientation function; obtaining a sum of each of the local orientation functions as an image direction function; obtaining a function $M_{CGCS}(\beta)$, and further obtaining the horizontal and gravity identification angles.

5 Claims, 2 Drawing Sheets

(58) Field of Classification Search
USPC .... 382/100, 103, 154; 348/231.99, 234, 169
See application file for complete search history.

(56) References Cited

U.S. PATENT DOCUMENTS

| 2013/0050529 | A1* | 2/2013 | Murayama | H04N 5/3572 |
| | | | | 348/234 |
| 2014/0254874 | A1* | 9/2014 | Kurz | G06K 9/42 |
| | | | | 382/103 |
| 2017/0104900 | A1* | 4/2017 | Kitaya | G06T 7/60 |

* cited by examiner

METHOD FOR DETECTING HORIZONTAL AND GRAVITY DIRECTIONS OF AN IMAGE

CROSS-REFERENCE TO RELATED APPLICATIONS

This application is the U.S. National Stage Entry under 35 U.S.C. §371 of International Application No. PCT/CN2014/076399, filed on Apr. 28, 2014.

TECHNICAL FIELD

The present invention relates to the field of image processing, in particular to a method for detecting the horizontal and gravity directions of an image.

BACKGROUND OF THE INVENTION

Detection of the horizontal and gravity directions of an image can be used in vehicle rollover warning, image tilt detection and so on, wherein the image tilt detection can be used in such applications as automatic scanning of images and image correction.

In the field of vehicle control, rollover prevention is an important aspect. The existing vision-based methods usually employ specific reference objects or are based on prior knowledge of the known environments, so they are suitable for highly structured road environments, but these methods lack universality and adaptability in unknown environments.

On the other hand, the methods that use the widely-employed inertial navigation system for roll attitude estimation so as to prevent rollover has the problem of error accumulation in addition to its high cost.

As far as automatic scanning of images and image correction are concerned, the prior arts mostly focus on detecting tilt angles of the text images, while for non-text images, there is no universal solution.

SUMMARY OF THE INVENTION

Directing at the defect in the prior art, the purpose of the present invention is to provide a method for detecting the horizontal and gravity directions of an image to realize effective and accurate detection.

In order to achieve the above-mentioned purpose, the present invention provides a method for detecting the horizontal and gravity directions of an image, which is used for gray images and comprises:

step S1: selecting equidistant sampling points in the image at an interval of the radius of the sampling circle of an attention focus detector;

step S2: placing the center of the sampling circle of the attention focus detector on each of the sampling points respectively, and using the attention focus detector to acquire attention focus coordinates $(x_i, y_i)$ and a corresponding significant orientation angle $\gamma_i$ ranging from 0 degree to 180 degrees, wherein the subscript i is corresponding to the ith attention focus and i is a natural number, and all attention focus coordinates and the corresponding significant orientation angles constitute a set $\Omega_p$;

step S3: for each element $(x_i, y_i, \gamma_i)$ in the set $\Omega_p$, using an orientation perceptron to determine a local orientation angle $\alpha_i$ and a weight $\eta_i$ at the attention focus $(x_i, y_i)$ near the significant orientation angle $\gamma_i$ according to the gray image information, said local orientation angle $\alpha_i$ ranging from 0 degree to 180 degrees, and generating a local orientation function $Dir_i(\theta) = \eta_i e^{-(\theta-\alpha_i)^2/\delta^2}$ to using the local orientation angle and the weight at the attention focus, wherein $\delta$ is a given constant and $\theta \in R = (-\infty, +\infty)$;

step S4: obtaining a sum of each of the local orientation functions as an image direction function $$P_I(\theta) = \sum_i Dir_i(\theta);$$

step S5: using a function $O_I(\theta) = P_I(\theta) + P_I(\theta+\pi/2)$, $\theta \in [0, \pi/2)$, and continuing $O_I(\theta)$ into a periodic function $O_I(\theta+\pi) = O_I(\theta)$, $\theta \in R$, then convolving said function with $$k_e(\theta) = \begin{cases} -\left(\dfrac{\theta}{a}\right)^4 + 1 & \theta \in [-a, a] \\ 0 & \text{else} \end{cases}$$

as a kernel function to obtain a function $$M_{CGCS}(\beta) = \int_{-\infty}^{+\infty} k_e(\beta - \theta) O_I(\theta) d\theta,$$

wherein $\alpha$ is a given constant and $\beta \in [0, \pi/2)$, and then obtaining the horizontal and gravity identification angles $\{\operatorname{argmax} M_{CGCS}(\beta), \operatorname{argmax} M_{CGCS}(\beta) + \pi/2\}$.

Further, in said step S1, the diameter of the sampling circle of the attention focus detector is 0.06 times of the short side length of the image.

Further, said step S2 specifically includes:

step S21: for each pixel point through which the sampling circle passes, making a normal line segment having a length of ⅕ of the diameter along a normal direction by using the pixel point as the central point, and calculating a gray mean of the pixels through which each normal line segment passes, and then on the sampling circle, calculating a difference between two gray means obtained from pixel points having a spacing of ¹⁄₁₅ of the diameter, and acquiring an absolute value $d_k$ of the difference. If the maximum one of the absolute values of the differences does not exceed a given threshold $T_0$, it means that no attention focus has been detected and said attention focus detector stops detecting, otherwise, the central point of the short arc formed between the two pixel points corresponding to the maximum one of the absolute values of the differences is used as the first gray sudden change point $p_m$;

step S22: calculating gray means $G_{up}$, $G_{down}$, $G_{left}$ and $G_{right}$ for four square areas, which are above, below, to the left and to the right of the first gray sudden change point $p_m$ and whose side lengths are ¹⁄₁₀ of the diameter, and calculating an angle $C_{pm}$ according to the following formula:

$$\begin{cases} C_{pm} = \angle(g_x, g_y) & C_{pm} \in [0, 2\pi) \\ g_x = G_{up} - G_{down} \\ g_y = G_{left} - G_{right} \end{cases};$$

step S23: constructing a chord from the first gray sudden change point $p_m$ along a direction perpendicular to $C_{pm}$, said chord intersecting with the sampling circle at another intersection point $p_o$, and searching for a second gray sudden change point near the intersection point $p_o$ along the sampling circle, if the second gray sudden change point does not exist, said attention focus detector stops detecting, if the second gray sudden change point exists, it is marked as $p_m'$, and the central point of the line $p_m p_m'$ between the first gray sudden change point and the second gray sudden change point is used as the attention focus, whose coordinate is marked as $(x_i, y_i)$, and the orientation of the chord $p_m p_m'$ is used as the corresponding significant orientation angle $\gamma_i$;

step S24: constituting a set $\Omega_p$ with all of the attention focus coordinates and the corresponding significant orientation angles.

Further, a receptive field response function of the orientation perceptron in step S3 is $$VL(x, y) = \sum_{j=1}^{3} k_j e^{-\frac{(x-a_j)^2}{2r_j^2}} \quad (x, y) \in \phi$$

wherein $\varphi$ is an area covered by the receptive field, which is expressed by a formula $$\left(\frac{x}{w_\phi/2}\right)^2 + \left(\frac{y}{l_\phi/2}\right)^2 \leq 1,$$

and (x, y) is the coordinate of a point in the receptive field; $k_j$, $r_j$, $a_j$(j=1, 2, 3), $l_\varphi$, $w_\varphi$ are parameters of the receptive field response function.

Further, said step S3 specifically includes:

step S31: searching for a zero point for s' (θ) at the attention focus $(x_i, y_i)$ within a range of angles $\delta_1$ centered on the significant on angle $\gamma_I$ using the formula of s'(θ)=∫∫VL'θ(−x sin θ+y cos θ,−x cos θ−y sin θ)I($x_i$−x, $y_i$−y)dxdy wherein VL'θ(−x sin θ+y cos θ,−x cos θ−y sin θ) is a derivative of VL(−x sin θ+y cos θ, −x cos θ−y sin θ) with respect to θ, I is the image and I($x_i$−x, $y_i$−y) is the gray value at the position ($x_i$−x, $y_i$−y), and an approximate solution $\alpha_i$ of s' (θ)=0 within the range of δ is calculated by means of dichotomy;

step S32: calculating $\eta_i$ by means of the following formula:

$$\eta_i = \begin{cases} \sqrt{|Neu(\alpha_i)| - T_1} & |Neu(\alpha_i)| \geq T_1 \\ 0 & |Neu(\alpha_i)| \leq T_1 \end{cases}$$

$$Neu(\alpha_i) = \frac{s(\alpha_i) - (s_{max} + s_{min})/2}{(s_{max} - s_{min})/2}$$

$$s(\alpha_i) = \int\int VL(\tilde{x}, \tilde{y}) I(x_i + x, y_i + y) dx dy$$

$$\tilde{x} = x\cos\alpha_i - y\sin\alpha_i$$

$$\tilde{y} = x\sin\alpha_i + y\cos\alpha_i$$

wherein $T_1$ is a given threshold, $s_{max}$ and $s_{min}$ are the maximum value and minimum value respectively that $s(\alpha_i)$ can reach in the gray image, and $$s_{max} = 255 \times \int_\phi V(VL(x, y)) dx dy,$$

-continued $$s_{min} = -255 \times \int_\phi V(-VL(x, y)) dx dy, \quad V(k) = \begin{cases} k, & k > 0 \\ 0, & k \leq 0 \end{cases};$$

step S33: generating a local orientation function $Dir_i(\theta) = \eta_i e^{-(\theta - \alpha_i)^2 / \delta^2}$ corresponding to $(x_i, y_i, \gamma_i)$.

The method for detecting the horizontal and gravity directions of an image according to the present invention has a fast processing speed and good effect, and it is suitable for direction detection for images with the presence of actual gravity or sensory gravity, such as paintings, natural images, texts and so on.

DETAILED DESCRIPTION OF THE INVENTION

The technical solution of the present invention will be described in further detail below by means of the embodiments and with reference to the drawings.

For gray images, the present invention uses an attention focus detector to acquire all attention focus coordinates and the corresponding significant orientation angles in the image coordinate system to constitute a set $\Omega_p$, and for each element in $\Omega_p$, an orientation perceptron is used to construct a corresponding local orientation function $Dir_i(\theta)$ according to gray image information, and then an image direction function $P_I(\theta)$ is obtained by summing. On this basis, a horizontal and gravity identification is performed to obtain the horizontal and gravity identification angles, thereby completing detection of the horizontal and gravity directions of the image.

Figure 1:
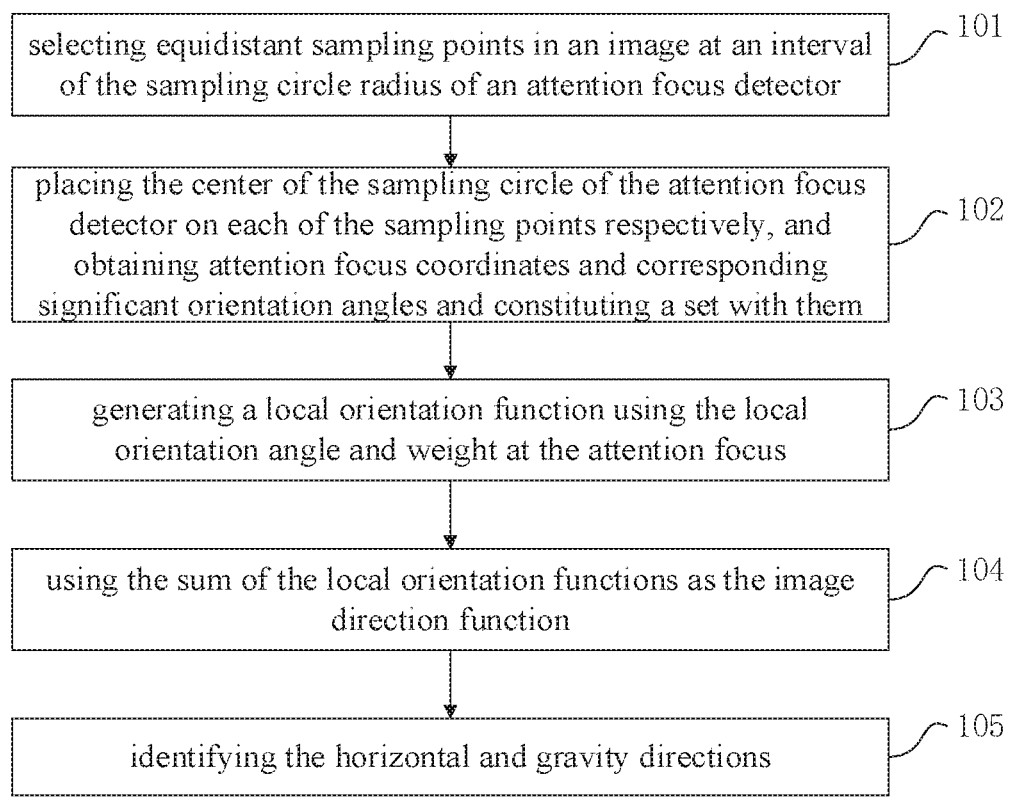
FIG. 1 is a flow chart of the method for detecting the horizontal and gravity directions of an image according to the present invention.

FIG. 1 is a flow chart of a method for detecting the horizontal and gravity directions of an image according to the present invention. As shown in FIG. 1, the present invention specifically comprises the following steps:

Step 101: selecting equidistant sampling points in an image at an interval of the radius of the sampling circle of an attention focus detector.

Figure 2:
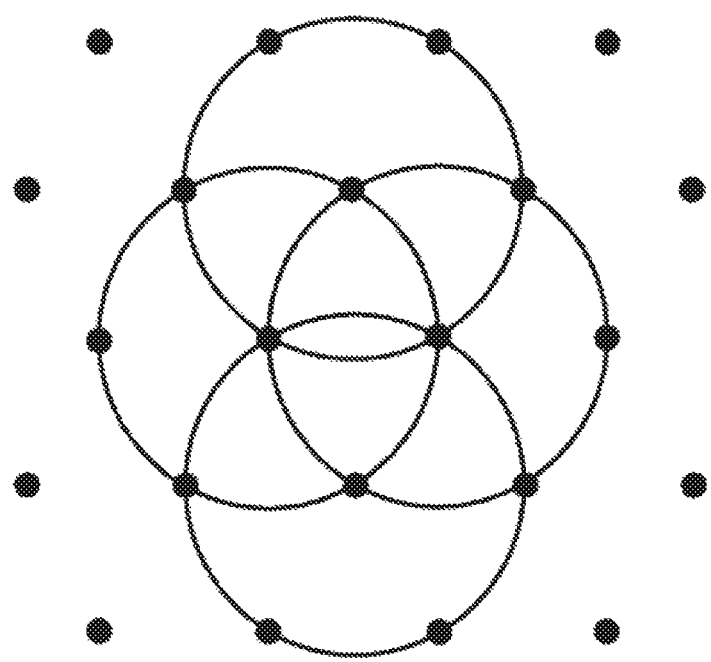
FIG. 2 is a schematic drawing of the distribution of attention focus detectors for the method for detecting the horizontal and gravity directions of an image according to the present invention.

FIG. 2 is a schematic drawing of the distribution of attention focus detectors for the method for detecting the horizontal and gravity directions of an image according to the present invention, wherein the diameter of the sampling circle of the attention focus detector is 0.06 times of the short side length of the image. The points in FIG. 2 are sampling points, and the circles are the sampling circles of the attention focus detectors.

Step 102: placing the center of the sampling circle of the attention focus detector on each of the sampling points respectively, and using the attention focus detector to acquire attention focus coordinates $(x_i, y_i)$ and the corresponding significant orientation angle $\gamma_i$ ($\gamma_i \in [0, \pi)$, wherein the subscript i is corresponding to the ith attention focus and i is a natural number, and all attention focus coordinates and the corresponding significant orientation angles constitute a set $\Omega_p$.

Specifically, step 102 includes following steps:

Step 1021: determining a first gray sudden change point $p_m$;

For each pixel point through which the sampling circle passes, making a normal line segment having a length of ⅕ of the diameter along a normal direction by using the pixel point as the central point, and calculating a gray mean of the pixels through which each normal line segment passes, and then on the sampling circle, calculating a difference between two gray means obtained from pixel points having a spacing of 1/15 of the diameter, and acquiring an absolute value $d_k$ of the difference. If the maximum one of the absolute values of the differences does not exceed a given threshold $T_0$, it means that no attention focus has been detected and the attention focus detector stops detecting, otherwise, the central point of the short arc formed between the two pixel points corresponding to the maximum one of the absolute values of the differences is used as the first gray sudden change point $p_m$.

Step 1022: calculating gray means $G_{up}$, $G_{down}$, $G_{left}$ and $G_{right}$ for four square areas, which are above, below, to the left and to the right of the first gray sudden change point $p_m$ and whose side lengths are 1/10 of the diameter, and calculating an angle $C_{pm}$ according to the following formula:

$$\begin{cases} C_{pm} = \angle(g_x, g_y) & C_{pm} \in [0, 2\pi) \\ g_x = G_{up} - G_{down} \\ g_y = G_{left} - G_{right} \end{cases} ;$$

Step 1023: constructing a chord from the first gray sudden change point $p_m$ along a direction perpendicular to $C_{pm}$, said chord intersecting with the sampling circle at another intersection point $p_o$, and searching for a second gray sudden change point near the intersection point $p_o$ along the sampling circle, if the second gray sudden change point does not exist, said attention focus detector stops detecting; if the second gray sudden change point exists, it is marked as $p_m'$, and the central point of the line $p_m p_m'$ between the first gray sudden change point and the second gray sudden change point is used as the attention focus, whose coordinate is marked as $(x_i, y_i)$, and the orientation of the chord $p_m p_m'$ is used as the corresponding significant orientation angle $\gamma_i$ ($\gamma_i \in [0, \pi)$).

Step 1024: constituting a set $\Omega_p$ using all of the attention focus coordinates and the corresponding significant orientation angles.

Step 103: for each element $(x_i, y_i, \gamma_i)$ in the set $\Omega_p$, using an orientation perceptron to determine a local orientation angle $\alpha_i$ ($\alpha_i \in [0, \pi)$) and a weight $\eta_i$ at the attention focus $(x_i, y_i)$ near the significant orientation angle $\gamma_i$ according to the gray image information, and generating a local orientation function $Dir_i(\theta) = \eta_i e^{-(\theta - \alpha_i)^2/\delta^2}$ using the local orientation angle and the weight at the attention focus, wherein $\delta$ is a given constant and $\theta \in R = (-\infty, +\infty)$.

The orientation perceptron in step 103 simulates simple cells in cerebral visual cortex, and the receptive field response function of the orientation perceptron is $$VL(x, y) = \sum_{j=1}^{3} k_j e^{-\frac{(x-a_j)^2}{2r_j^2}} \quad (x, y) \in \phi$$

wherein $\varphi$ is an area covered by the receptive field, which is expressed by the formula $$\left(\frac{x}{w_\phi/2}\right)^2 + \left(\frac{y}{l_\phi/2}\right)^2 \leq 1,$$

and $(x, y)$ is the coordinate of a point in the receptive field; $k_j$, $r_j$, $a_j$ ($j=1, 2, 3$), $l_{100}$, $w_\varphi$ are parameters of the receptive field response function.

Step 103 specifically includes following steps:

Step 1031: searching for a zero point for $s'(\theta)$ at the attention focus $(x_i, y_i)$ within a range of angle $\delta_1$ centered on the significant orientation angle $\gamma_i$, specifically by using the formula of $$s'(\theta) = \iint VL'_\theta(-x\sin\theta + y\cos\theta, -x\cos\theta - y\sin\theta) I(x_i - x, y_i - y) dx dy$$

wherein $VL'_\theta(-x\sin\theta + y\cos\theta, -x\cos\theta - y\sin\theta)$ is a derivative of $VL(-x\sin\theta + y\cos\theta, -x\cos\theta - y\sin\theta)$ with respect to $\theta$, $I$ is the image and $I(x_i - x, y_i - y)$ is the gray value at the position $(x_i - x, y_i - y)$, and an approximate solution $\alpha_i$ of $s'(\theta) = 0$ within the range of $\delta$ is calculated by means of dichotomy;

Step 1032: calculating $\eta_i$ by means of the following formula:

$$\eta_I = \begin{cases} \sqrt{|Neu(\alpha_i)| - T_1} & |Neu(\alpha_i)| \geq T_1 \\ 0 & |Neu(\alpha_i)| < T_1 \end{cases}$$

$$Neu(\alpha_i) = \frac{s(\alpha_i) - (s_{max} + s_{min})/2}{(s_{max} + s_{min})/2}$$

$$s(\alpha_i) = \iint VL(\tilde{x}, \tilde{y}) I(x_i + x, y_i + y) dx dy$$

$$\tilde{x} = x\cos\alpha_i - y\sin\alpha_i$$

$$\tilde{y} = x\sin\alpha_i + y\cos\alpha_i$$

wherein $T_1$ is a given threshold, $s_{max}$ and $s_{min}$ are the maximum value and minimum value respectively that $s(\alpha_i)$ can reach in the gray image, and $$s_{max} = 255 \times \int_\phi V(VL(x, y)) dx dy,$$

$$s_{min} = -255 \times \int_\phi V(-VL(x, y)) dx dy, \quad V(k) = \begin{cases} k, & k > 0 \\ 0, & k \leq 0 \end{cases};$$

Step 1033: generating a local orientation function $Dir_i(\theta) = \eta_i e^{-(\theta - \alpha_i)^2/\delta^2}$ corresponding to $(x_i, y_i, \gamma_i)$.

Step 104: using the sum of the local orientation functions as the image direction function $$P_I(\theta) = \sum_i Dir_i(\theta).$$

Step 105: identifying the horizontal and gravity directions; using the function $O_I(\theta) = P_I(\theta) + P_I(\theta + \pi/2)$, $\theta \in [0, \pi/2]$ and continuing $O_I(\theta)$ into a periodic function $O_I(\theta + \pi) = O_I(\theta)$, $\theta \in R$, then convolving said function with $$k_e(\theta) = \begin{cases} -\left(\frac{\theta}{a}\right)^4 + 1 & \theta \in [-a, a] \\ 0 & \text{else} \end{cases}$$

as a kernel function to obtain a function $$M_{CGCS}(\beta) = \int_{-\infty}^{+\infty} k_e(\beta-\theta)O_I(\theta)d\theta,$$

wherein $\alpha$ is a given constant and $\beta \in [0, \pi/2)$, and then obtaining the horizontal and gravity identification angles $\{\text{argmax}M_{CGCS}(\beta), \text{argmax}M_{CGCS}(\beta)+\pi/2\}$.

In a specific embodiment, $l_\varphi$ is 0.06 times of the short side length of the image, $k_1=200$, $k_2=k_3=-60$, $r_1=0.424l_\varphi$, $r_2=1.3l_\varphi$, $r_3=-1.3l_{100}$, $a_1=0$, $a_2=a_3=0.11_\varphi$, $w_\varphi=0.5l_\varphi$, $T_0=20$, $\delta^2=0.1$, $\delta_1=\pi/3$, $T_1=0.1$, $\alpha=\pi3$.

The method for detecting the horizontal and gravity directions of an image according to the present invention has a fast processing speed and good effect, and it is suitable for direction detection of images with the presence of actual gravity or sensory gravity, such as paintings, natural images, texts and so on. Said method is promising for applications particularly in fields such as vehicle rollover warning, automatic scanning of images and image correction.

Professionals shall be able to further realize that the exemplary units and algorithm steps described in conjunction with the embodiments disclosed herein can be implemented by electronic hardware, computer software or a combination of both, and in order to clearly illustrate the interchangeability between the hardware and software, components and steps of each example have been generally described according to the functions thereof in the above texts. As for whether said functions are achieved by hardware or by software, it depends on the specific application and restrictions for the design of the technical solution. Professionals can use different methods for each specific application to realize the described functions, while such realization should not be considered as going beyond the scope of the present invention.

Steps of the method or algorithm described in conjunction with embodiments disclosed herein can be carried out by hardware, software modules executed by a processor, or a combination of both. The software modules may reside in a random access memory (RAM), a memory, a read-only memory (ROM), an electrically programmable ROM, an electrically erasable and programmable ROM, a register, a hard disc, a movable disc, a CD-ROM, or any other forms of storage medium known in the art.

The above-described specific embodiments further illustrate the object, technical solution and beneficial effect of the present invention. But it shall be understood that the above descriptions are merely the specific embodiments of the present invention, hut they are not intended to limit the protection scope of the present invention. Any modification, equivalent substitution and improvement made under the spirit and principle of the present invention shall be included in the protection scope of the present invention.

What is claimed is:

1. A method for detecting the horizontal and gravity directions of an image, characterized in that said method comprises:
   step S1: selecting equidistant sampling points in the image at an interval of the radius of the sampling circle of an attention focus detector;
   step S2: placing the center of the sampling circle of the attention focus detector on each of the sampling points respectively, and using the attention focus detector to acquire attention focus coordinates $(x_i, y_i)$ and the corresponding significant orientation angle $\gamma_i$ ranging from 0 degree to 180 degrees, wherein the subscript i is corresponding to the ith attention focus and i is a natural number, and all attention focus coordinates and the corresponding significant orientation angles constitute a set $\Omega_p$;
   step S3: for each element $(x_i, y_i, \gamma_i)$ in the set $\Omega_p$, using an orientation perceptron to determine a local orientation angle $\alpha_i$ and a weight $\eta_i$ at the attention focus $(x_i, y_i)$ near the significant orientation angle $\gamma_i$ according to the gray image information, said local orientation angle $\alpha_i$ ranging from 0 degree to 180 degrees, and generating a local orientation function $\text{Dir}_i(\theta)=\eta_i e^{-(\theta-\alpha_i)^2/\delta^2}$ using the local orientation angle and weight at the attention focus, wherein $\delta$ is a given constant and $\theta \in R=(-\infty, -\infty)$;
   step S4: obtaining a sum of each of the local orientation functions as an image direction function $$P_I(\theta) = \sum_i \text{Dir}_i(\theta);$$

step S5: using a function $O_I(\theta)=P_I(\theta)+P_I(\theta+\pi/2)$, $\theta\in[0,\pi/2)$, and continuing $O_I(\theta)$ into a periodic function $O_I(\theta+\pi)=O_I(\theta)$, $\theta\in R$, then convolving said function with $$k_e(\theta) = \begin{cases} -\left(\dfrac{\theta}{a}\right)^4 + 1 & \theta \in [-a, a] \\ 0 & \text{else} \end{cases}$$

as a kernel function to obtain a function $$M_{CGCS}(\beta) = \int_{-\infty}^{+\infty} k_e(\beta-\theta)O_I(\theta)d\theta,$$

wherein $\alpha$ is a given constant and $\beta \in [0, \pi/2)$, and then obtaining the horizontal and gravity identification angles $\{\text{argmax}M_{CGCS}(\beta), \text{argmax}M_{CGCS}(\beta)+\pi/2\}$.

2. The method for detecting the horizontal and gravity directions of an image according to claim 1, characterized in that in said step S1, the diameter of the sampling circle of the attention focus detector is 0.06 times of the short side length of the image.

3. The method for detecting the horizontal and gravity directions of an image according to claim 1, characterized in that said step S2 specifically includes:
   step S21: for each pixel point through which the sampling circle passes, making a normal line segment having a length of ⅕ of the diameter along a normal direction by using the pixel point as the central point, and calculating a gray mean of the pixels through which each normal line segment passes, and then on the sampling circle, calculating a difference between two gray means obtained from pixel points having a spacing of ¹⁄₁₅ of the diameter, and acquiring an absolute value $d_k$ of the difference, if the maximum one of the absolute values of the differences does not exceed a given threshold $T_0$, it means that no attention focus has been detected and said attention focus detector stops detecting, otherwise, the central point of the short arc formed between the two pixel points corresponding to the maximum one of the absolute values of the differences is used as the first gray sudden change point $p_m$;

step S22: calculating gray means $G_{up}$, $G_{down}$, $G_{left}$ and $G_{right}$ for four square areas, which are above, below, to the left and to the right of the first gray sudden change point $p_m$ and whose side lengths are 1/10 of the diameter, and calculating an angle $C_{pm}$ according to the following formula:

$$\begin{cases} C_{pm} = \angle(g_x, g_y) & C_{pm} \in [0, 2\pi) \\ g_x = G_{up} - G_{down} \\ g_y = G_{left} - G_{right} \end{cases} ;$$

step S23: constructing a chord from the first gray sudden change point $p_m$ along a direction perpendicular to $C_{pm}$, said chord intersecting with the sampling circle at another intersection point $p_o$, and searching for a second gray sudden change point near the intersection point $p_o$ along the sampling circle, if the second gray sudden change point does not exist, said attention focus detector stops detecting, if the second gray sudden change point exists, it is marked as $p_m'$, and the central point of the line $p_m p_m'$ between the first gray sudden change point and the second gray sudden change point is used as the attention focus, whose coordinate is marked as $(x_i, y_i)$, and the orientation of the chord $p_m p_m'$ is used as the corresponding significant orientation angle $\gamma_i$;

step S24: constituting a set $\Omega_p$ with all of the attention focus coordinates and the corresponding significant orientation angles.

4. The method for detecting the horizontal and gravity directions of an image according to claim 1, characterized in that a receptive field response function of the orientation perceptron in step S3 is $$VL(x, y) = \sum_{j=1}^{3} k_j e^{-\frac{(x-a_j)^2}{2r_j^2}} \quad (x, y) \in \phi$$

wherein $\phi$ is an area covered by the receptive field, which is expressed by a formula $$\left(\frac{x}{w_\phi/2}\right)^2 + \left(\frac{y}{l_\phi/2}\right)^2 \leq 1,$$

and (x, y) is the coordinate of a point in the receptive field; $k_j$, $r_j$, $a_j$(j=1, 2, 3), $l_\phi$, $w_\phi$ are parameters of the receptive field response function.

5. The method for detecting the horizontal and gravity directions of an image according to claim 1, characterized in that said step S3 specifically includes:

step S31: searching for a zero point for s' ($\theta$) at the attention focus $(x_i, y_i)$ within a range of angles $\delta_1$ centered on the significant orientation angle $\gamma_i$ by using the formula of $$s'(\theta) = \iint VL'_\phi(-x \sin\theta + y \cos\theta, -x \cos\theta - y \sin\theta) I(x_i - x, y_i - y) dx dy$$

wherein $VL'_\theta(-x \sin\theta + y \cos\theta, -x \cos\theta - y \sin\theta)$ is a derivative of $VL(-x \sin\theta + y \cos\theta, -x \cos\theta - y \sin\theta)$ with respect to $\theta$, I is the image and $I(x_i - x, y_i - y)$ is the gray value at the position $(x_i - x, y_i - y)$, and an approximate solution $\alpha_i$ of s' ($\theta$)=0 within the range of $\delta$ is calculated by means of dichotomy;

step S32: calculating $\eta_i$ by means of the following formula:

$$\eta_l = \begin{cases} \sqrt{|Neu(\alpha_i)| - T_1} & |Neu(\alpha_i)| \geq T_1 \\ 0 & |Neu(\alpha_i)| < T_1 \end{cases}$$

$$Neu(\alpha_i) = \frac{s(\alpha_i) - (s_{max} + s_{min})/2}{(s_{max} + s_{min})/2}$$

$$s(\alpha_i) = \iint VL(\tilde{x}, \tilde{y}) I(x_i + x, y_i + y) dx dy$$

$$\tilde{x} = x\cos\alpha_i - y\sin\alpha_i$$

$$\tilde{y} = x\sin\alpha_i + y\cos\alpha_i$$

wherein $T_1$ is a given threshold, $s_{max}$ and $s_{min}$ are the maximum value and minimum value respectively that $s(\alpha_i)$ can reach in the gray image, and $$s_{max} = 255 \times \int_\phi V(VL(x, y)) dx dy,$$

$$s_{min} = -255 \times \int_\phi V(-VL(x, y)) dx dy, \quad V(k) = \begin{cases} k, & k > 0 \\ 0, & k \leq 0 \end{cases};$$

step S33: generating a local orientation function $Dir_i(\theta) = \eta_i e^{-(\theta - \alpha_i)^2/\delta^2}$ corresponding to $(x_i, y_i, \gamma_i)$.

* * * * *